United States Patent
Park (10) Patent No.: US 9,857,940 B2
(45) Date of Patent: Jan. 2, 2018

(54) METHOD AND APPARATUS FOR MANAGING SCREENS IN A PORTABLE TERMINAL

(71) Applicant: Samsung Electronics Co., Ltd., Gyeonggi-do (KR)

(72) Inventor: In-Kook Park, Gyeongsangbuk-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 406 days.

(21) Appl. No.: 13/849,663

(22) Filed: Mar. 25, 2013

(65) Prior Publication Data

US 2013/0254715 A1    Sep. 26, 2013

(30) Foreign Application Priority Data

Mar. 26, 2012    (KR) .................. 10-2012-0030623

(51) Int. Cl.
*G06F 3/0486*        (2013.01)
*G06F 3/0481*        (2013.01)

(52) U.S. Cl.
CPC ........ *G06F 3/04817* (2013.01); *G06F 3/0486* (2013.01)

(58) Field of Classification Search
CPC .................................................. G06F 3/04817
USPC ....................................................... 715/810
See application file for complete search history.

(56) References Cited

U.S. PATENT DOCUMENTS

| 5,297,253 | A  | * | 3/1994  | Meisel ............. G06F 17/30716 345/440 |
| 6,661,438 | B1 | * | 12/2003 | Shiraishi et al. ............. 715/835 |
| 7,509,588 | B2 |   | 3/2009  | Van Os et al. |
| 2010/0088597 | A1 | * | 4/2010 | Shin et al. ..................... 715/704 |
| 2010/0146450 | A1 | * | 6/2010 | Harada ............. G06F 17/30126 715/838 |
| 2010/0223563 | A1 |   | 9/2010  | Green |

(Continued)

FOREIGN PATENT DOCUMENTS

| CN | 101714060 A | 5/2010 |
| EP | 2 469 389 A1 | 6/2012 |

(Continued)

OTHER PUBLICATIONS

Samsung; Samsung Galaxy Tab 8.9—Android Tablet User Manual; Jan. 1, 2011; XP 055023009; http://images.comparecellular.com/phones/1577/8.9-ug-eng.pdf [Rtvd Mar. 26, 2012].
European Search Report dated Sep. 23, 2016.
Samsung Galaxy Tab 8.9 Android Tablet User Manual, Jan. 1, 2011 pp. 1-188, XP005023009 http://images.comparecellular.com/phones/1577/8.9-ug-eng.pdf.

(Continued)

*Primary Examiner* — Tadeese Hailu
*Assistant Examiner* — Darrin Hope
(74) *Attorney, Agent, or Firm* — Cha & Reiter, LLC.

(57) ABSTRACT

A method of managing screens of a portable terminal includes: requesting a movement of an icon; displaying summary information corresponding to each of the screens in response to the request; requesting a movement and a rearrangement of the icon in relation to one piece of summary information among the displayed summary information; and moving the icon to and rearranging the icon on a screen corresponding to the summary information in relation to which the movement and the rearrangement of the icon is requested.

18 Claims, 5 Drawing Sheets

Screen 4

(56) References Cited

U.S. PATENT DOCUMENTS

| | | | |
|---|---|---|---|
| 2010/0295789 A1 | 11/2010 | Shin et al. | |
| 2011/0113486 A1* | 5/2011 | Hunt | G06F 3/0481 |
| | | | 726/19 |
| 2011/0271182 A1 | 11/2011 | Tsai et al. | |
| 2012/0084692 A1* | 4/2012 | Bae | G06F 3/04817 |
| | | | 715/769 |
| 2012/0096396 A1* | 4/2012 | Ording | G06F 9/4443 |
| | | | 715/799 |
| 2012/0165076 A1* | 6/2012 | Yu et al. | 455/566 |
| 2012/0188275 A1* | 7/2012 | Shimazu | G06F 3/0483 |
| | | | 345/629 |
| 2013/0050119 A1 | 2/2013 | Nemoto | |

FOREIGN PATENT DOCUMENTS

| | | |
|---|---|---|
| EP | 2590064 A2 | 5/2013 |
| JP | 2012-155416 A | 8/2012 |
| KR | 2005-0101247 A | 10/2005 |
| KR | 10-2012-0003537 A | 1/2012 |

OTHER PUBLICATIONS

Matt Demers, In Depth: GO Launcher EX, Jan. 26, 2011, pp. 1-9, XP055215942 http://www.droid-life.com/2011/01/26/in-depth-go-launcher-ex/.
Android Apps in Depth—02—Go Launcher Ex, Mar. 6, 2011, p. 1, XP054976088 http://www.youtube.com/watch?v=u5LISE8BU_E.
Japanese Search Report dated Dec. 27, 2016.
Chinese Search Report dated Feb. 28, 2017.

* cited by examiner

METHOD AND APPARATUS FOR MANAGING SCREENS IN A PORTABLE TERMINAL

CLAIM OF PRIORITY

This application claims the priority under 35 U.S.C. §119(a) to Korean Patent Application Serial No. 10-2012-0030623, which was filed in the Korean Intellectual Property Office on Mar. 26, 2012, the entire content of which is hereby incorporated by reference.

BACKGROUND OF THE INVENTION

1. Field of the Invention

The present invention relates generally to a portable terminal, and more particularly, to a method and an apparatus for managing screens of a portable terminal.

2. Description of the Related Art

Currently, portable terminals such as smart phones provide various functions such as those of a multimedia player, an electronic book reader, a text editor, and a game console.

In operation, various functions of portable terminals are provided by arranging icons in the background (i.e., wall paper) for quickly selecting and executing a particular function. As applications downloaded from numerous sources, such as the Android Market or App Store, by a user increase, the number of icons arranged on the screen also has increased.

Due to limited display area in the portable terminals, it is impossible to arrange all icons in one screen. Therefore, portable terminals provide a plurality of screens, on each of which different icons are arranged.

However, as the number of icons arranged on the screen increases, it becomes difficult to manage icons and screens where icons are arranged.

Though it may be easy to manage icons and screens in case of devices, such as a desktop computer, including convenient input units such as a keyboard and a mouse, it is difficult to manage icons and screens in portable terminals for which it is not easy to use a keyboard or a mouse. For example, a portable terminal provides plural screens, switching between which is performed using touching and dragging the screens. To move an icon arranged on a particular screen to another screen, it is required to first touch the icon and then keep on dragging the icon toward said another screen, which causes inconvenience during operation.

Accordingly, it is necessary to propose an invention which enables convenient managing of screens and icons arranged on the screens even in a portable terminal.

SUMMARY OF THE INVENTION

Accordingly, an aspect of the present invention is to provide a method and an apparatus for conveniently managing screens and icons arranged on the screens in a portable terminal, by which a user can easily change the sequence of arranged screens and easily move icons arranged on the screens.

According to an aspect of the present invention, a method of managing screens of a portable terminal includes: displaying summary information showing a plurality of summary icons corresponding to each of the screens in response to a request to move a particular icon; moving the particular icon to one of the plurality of summary icons; and moving the particular icon to the one of the plurality of summary icons corresponding to a desired screen.

According to another aspect of the present invention, a screen management apparatus for a portable terminal includes: a display for displaying a plurality of screens in which icons can be arranged; and a controller for displaying summary information showing a plurality of summary icons corresponding to each of the screens in response to a request to move a particular icon, moving the particular icon to one of the plurality of summary icons; and moving the particular icon to the one of the plurality of summary icons corresponding to a desired screen.

A method and an apparatus according to the present invention enable convenient managing of screens and icons arranged on the screens in a portable terminal By the method and the apparatus, a user can easily change the sequence of arranged screens and easily move icons arranged on the screens.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS

Hereinafter, various embodiments of the present invention will now be described with reference to the accompanying drawings.

Figure 1:
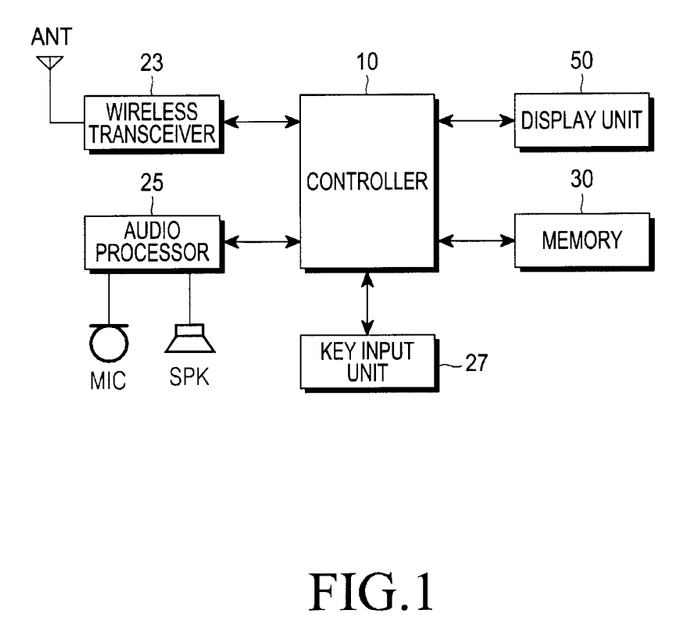
FIG. 1 is a block diagram illustrating a portable terminal according to an embodiment of the present invention.

FIG. 1 is a block diagram illustrating a portable terminal according to an embodiment of the present invention. It is assumed that the portable terminal is an electronic device, which is easily portable and movable and can display a plurality of items by scrolling, such as a display phone, a feature phone, a smart phone, an international mobile telecommunication 2000 (IMT-2000) terminal, a wideband code division multiple access (WCDMA) terminal, a universal mobile telecommunication service (UMTS) terminal, a personal digital assistant (PDA), a portable multimedia player (PMP), a digital multimedia broadcasting (DMB) terminal, an electronic (E)-book terminal, a laptop computer, a tablet personal computer, and a digital camera.

Hereinafter, a configuration of the portable terminal will be described with reference to FIG. 1.

A wireless transceiver 23 includes a radio frequency (RF) unit and a modem. The RF unit includes an RF transmitter for up-converting and amplifying the frequency of a transmitted signal, and an RF receiver for low-noise amplifying a received signal and down-converting the frequency of the received signal. The modem includes a transmitter for encoding and modulating signals to be transmitted and a receiver for demodulating and decoding signals received from the RF unit.

An audio processor 25 may form a codec, which includes a data codec and an audio codec. The data codec processes data packets, and the audio codec processes audio signals such as voices and multimedia files. The audio processor 25 converts digital audio signals received from the modem into analog signals using the audio codec and plays the same or converts analog audio signals generated from a microphone into digital audio signals using the audio codec and transmits the same to the modem. The codec may be provided additionally or included in a controller 10.

A key input unit 27 may include a touch pad or functional keys used to input numbers and letters and function keys. When a display unit 50 is embodied as a capacitive or resistive touch screen display, the display unit 50 may partially replace the key inputting function of the key input unit 27.

A memory 30 may include program memories and data memories. The program memory may store programs for controlling general operations of the portable terminal. The memory 30 may further include an external memory such as a compact flash (CF) card, a secure digital (SD) card, a micro-SD card, a mini-SD card, an extreme digital (xD) card, or a memory stick. Also, the memory 30 may include a disk such as a hard disk drive (HDD) or a solid state disk (SSD).

The display unit 50 may be implemented with a liquid crystal display (LCD) or organic light emitting diodes (OLED) such as passive mode OLED (PMOLED) and active mode OLED (AMOLED). The display unit 50 may include a capacitive (or an electrostatic capacity type) touch screen or a resistive touch screen to operate as an input unit controlling the portable terminal, together with the key input unit 27.

The display unit 50 according to an embodiment of the present invention displays icons, which are used as shortcuts to quickly open or execute an application, a text, or a multimedia file, on a screen thereof. Especially, the screen may display widgets efficiently providing weather, news, or stock market information. Accordingly, the embodiment of the present invention for managing screens and icons arranged on the screens may be identically applied to the widgets so that it can be applied to moving of a widget from a specific screen to another screen.

The controller 10 controls overall operations of the portable terminal according to an embodiment of the present invention and may convert and control the operations of the portable terminal according to an input from a user via the key input unit 27, the display unit 50, or the like. When a movement of at least one of the icons arranged on one of a plurality of screens is requested, the controller 10 makes a control to display summary information corresponding to each of the screens. When a user requests to move and arrange an icon in relation to one piece of the displayed summary information, the controller 10 makes a control to move and arrange the icon to a screen corresponding to the summary information. Detailed operations of the controller 10 will be described later.

On the other hand, although devices which may be included in the portable terminal, such as a Bluetooth module, a camera module, a wireless fidelity (WiFi) module, an acceleration sensor, a proximity sensor, an earth magnetic field sensor, or a DMB receiver, are not shown in FIG. 1, it will be obvious to those skilled in the art that such devices not shown in the drawing may be included in the portable terminal and may provide corresponding functions.

Figure 2:
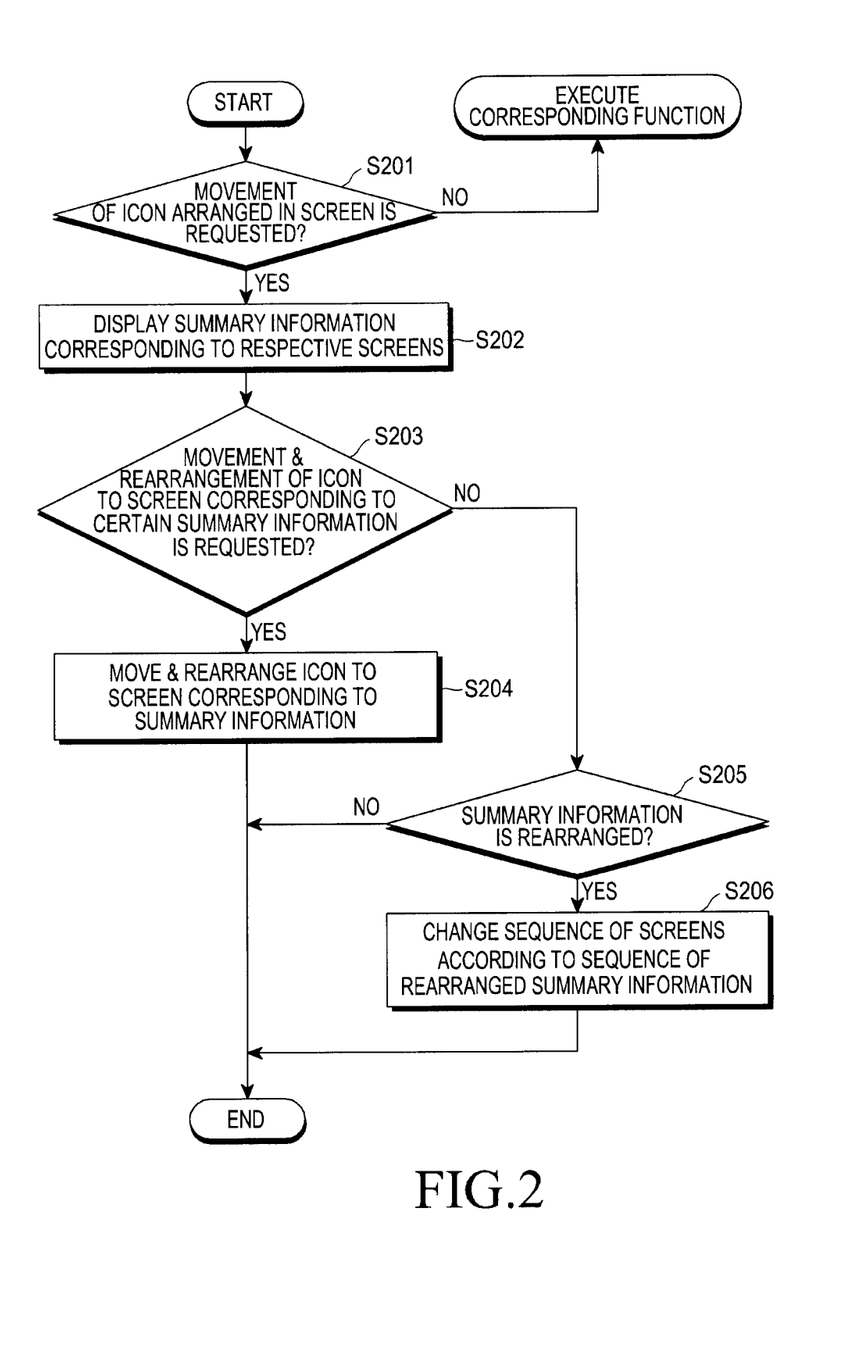
FIG. 2 is a flowchart illustrating a process of managing screens according to an embodiment of the present invention.

FIG. 2 is a flowchart illustrating a process of managing screens according to an embodiment of the present invention, and FIGS. 3A to 5C are views illustrating first, second, and third exemplary operations for managing screens according to an embodiment of the present invention. Hereinafter, the embodiment of the present invention will be described with reference to drawings, based on an assumption that a portable terminal of a user includes four screens (wallpapers). However, it should be noted that the number of screens shown for illustrative purposes should not limit the scope of the invention.

In steps S201 and S202, when it is requested to move any one of icons displayed on a screen, the controller 10 makes a control to display summary information corresponding to each screen in response to the request of the user.

Referring to FIG. 3A to FIG. 3D, while using a portable terminal including screens (wallpapers) 1 to 4, the user may request an icon arranged on one screen to be moved to another screen.

In this case, the icon described in embodiments of the present invention indicates an image used for a shortcut to quickly execute or open an application, a text, a multimedia file, or the like. Also, icons 311, 312, 321, 331, 334, 341, and 342 shown in FIGS. 3A, 3B, 3C and FIG. 3D are examples of icons corresponding to applications, and icons 332 and 333 are examples of icons corresponding to texts. In the present embodiment, an icon may include a group icon, which may represent a group of multiple icons, or a widget.

Referring to FIG. 3A to FIG. 3D, the sequence of first screen 310, second screen 320, third screen 330, and fourth screen 340 corresponds to a sequence of arrangement (or display) of the screens. For example, when screen 1 (310) is designated as a home screen, screen 1 is set as the first, screen 2 (320) is set as the second, screen 3 (330) is set as the third, and screen 4 (340) is set as the fourth. Accordingly, the user may request a change from screen 1 to screen 2 by performing a single input of touch (for example, an input of touch and drag to the left), and may request a change to screen 3 or screen 4 by performing two or three inputs of touch (for example, inputs of touch and drag to the left).

On the other hand, although the following description of the embodiment of the present invention is based on an assumption that at most four icons may be arranged on each screen, this assumption is just for convenience of description and illustrative purposes, thus the number of icons available to be arranged for each screen may vary with the specification of the display unit 50 and the configuration of the portable terminal.

Figure 3A:
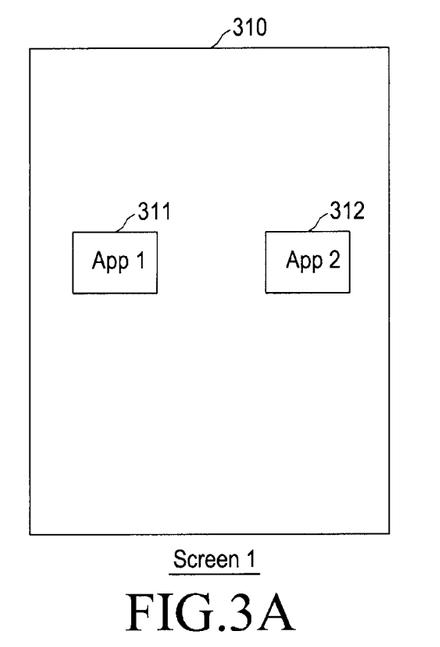
FIGS. 3A, 3B, 3C and 3D are views illustrating a first example of managing screens according to an embodiment of the present invention.
Figure 3B:
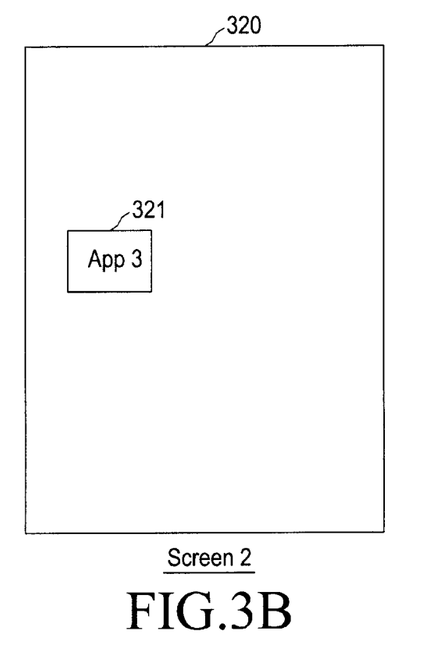
Figure 3C:
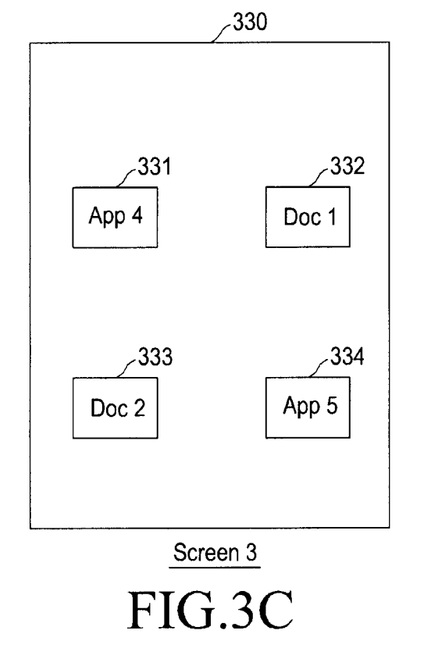
Figure 3D:
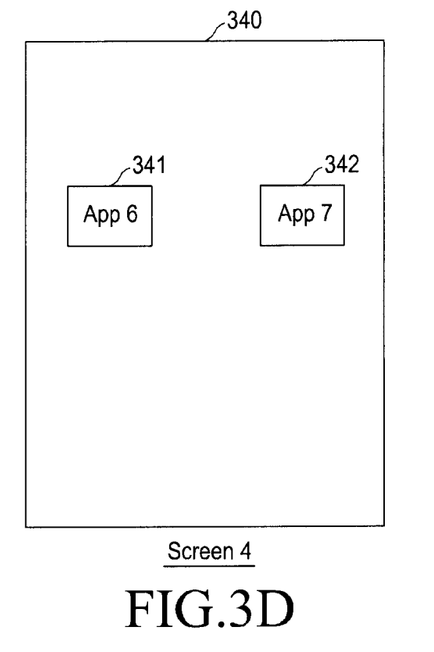

According to above assumption, two icons may be additionally arranged on screen 1 shown in FIG. 3A, three icons may be additionally arranged on screen 2 shown in FIG. 3B, none icons may be additionally arranged on screen 3 shown in FIG. 3C, and two icons may be additionally arranged on screen 4 shown in FIG. 3D.

Figure 4A:
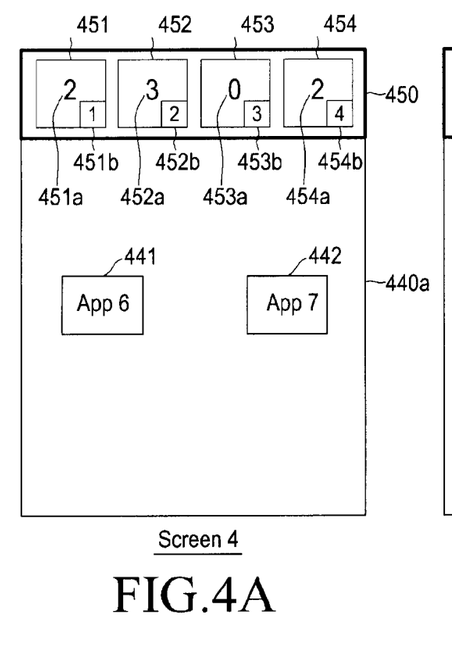
FIGS. 4A, 4B, 4C and 4D are views illustrating a second example of managing screens according to an embodiment of the present invention.

To describe steps S201 and S202 based on the above description referring to FIG. 3A to FIG. 3D, a user may request a movement of an icon by selecting a menu, activating a switch, or touching one of icons displayed on a screen (e.g. one of screens 1 to 4) for more than a certain period of time (e.g. through a long touch). For example, when the user makes a long contact on the icon 342 in order to move the icon 342 on screen 4 shown in FIG. 3D, the controller 10 responsively generates a separate area in the screen 450 and then makes a control to display summary information of each screen as shown in FIG. 4A through the generated screen 450. On the other hand, the present embodiment may provide a function of displaying summary information corresponding to screens via a previously set input, in addition to a menu-operation or a long touch on an icon as described above.

In this case, the summary information of each screen may be displayed in the form of an On-Screen Display (OSD) on a screen currently used by the user (e.g. a screen where an icon is requested to be moved to), instead of being independently displayed via the separate area of a screen.

Meanwhile, in the embodiment of the present invention, the summary information corresponding to each screen includes the number of icons which can be moved to a corresponding screen (i.e. which can be additionally arranged on the corresponding screen), and the arrangement sequence (display sequence) of the screen.

Referring to FIG. 4A, it is noted that summary information corresponding to screen 1 is indicated by reference numeral (or summary icon) 451, and the summary information 451 shows that the number of icons, which can be further moved or added to (arranged on) screen 1 shown in FIG. 3A, is two as indicated by reference numeral 451*a* and that the screen is the first screen (e.g. the home screen) as indicated by reference numeral 451*b*.

Similarly, it is noted that summary information corresponding to screen 2 is indicated by reference numeral (or summary icon) 452, it has two icons which can be further moved or added to (arranged on) screen 2 shown in FIG. 3B, and the screen is the second screen. Also, it is noted that summary information corresponding to screen 3 and screen 4 are indicated by reference numerals (or summary icons) 453 and 454, they have 0 icons and two icons which can be further moved or added to (arranged on) screen 3 and screen 4 shown in FIGS. 3C and 3D, and the screens are the third and the fourth screens, respectively.

Further, in the present embodiment, the displayed summary information corresponding to each screen may include an image of an icon (or icons) or the number of the icon (or icons) arranged on (or included in) a particular screen.

In steps S201 and S202 described above, by performing a long contact (by requesting a movement of) on an icon 342 desired to be moved while viewing screen 4 as shown in FIG. 3D, the user may determine, based on the summary information for each screen as shown in FIG. 4A, a screen to which the icon can be moved and whether it is possible or not to move the icon to a certain screen. For example, from the summary information 453 corresponding to screen 3 shown in FIG. 4A, the user can understand that the number of movable icons on screen 3 is zero and it is thus impossible to move the icon 442 to screen 3.

Meanwhile, when summary information is displayed in an embodiment of the present invention, the summary information corresponding to a screen to which an icon cannot be moved may be displayed in a predetermined set color so that it can be distinguished from summary information corresponding to a screen to which an icon can be moved. For example, since four icons have already been arranged on screen 3 and it is thus impossible to move another icon to screen 3, the summary information 453 corresponding to screen 3 may be displayed in a red color so that it can be distinguished from other summary information.

Alternatively, when summary information is displayed in an embodiment of the present invention, display of summary information corresponding to a screen to which an icon cannot be moved may be omitted. As a result, it is possible to prevent display of unnecessary summary information (that is, summary information corresponding to a screen to which an icon cannot be moved).

In steps S203 and S204, when an icon is requested to be moved to and arranged on a screen corresponding to one piece of summary information among the displayed summary information, the controller 10 makes a control to move and arrange (rearrange) the icon to and on the screen corresponding to the one piece of summary information, in response to the request.

As shown in FIG. 4A, by identifying summary information corresponding to each screen, the user can identify that screens to which an icon can be moved are screens 1 and 2. In this case, since the screen that the user is currently viewing is screen 4, the user may only rearrange the icon within screen 4.

Figure 4B:
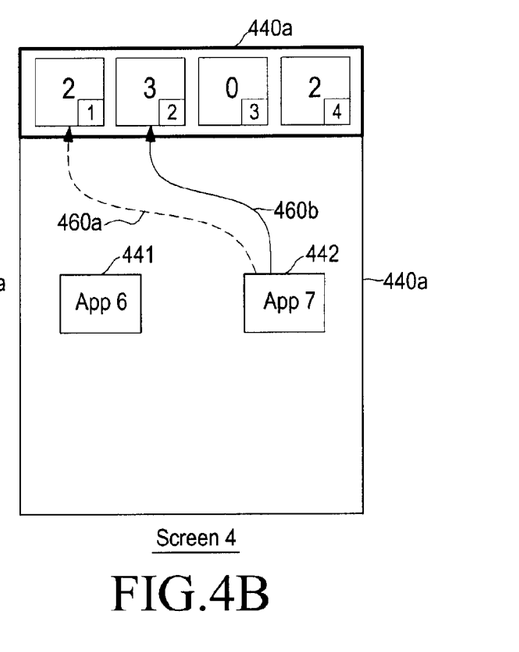

In an embodiment of the present invention, moving an icon from one screen to another screen may be performed by moving the icon onto summary information corresponding to the desired screen (for example, dragging the icon to be located on the summary information). Referring to FIG. 4B, as indicated by reference numerals 460*a* and 460*b*, the user may selectively move the icon 442 to the summary information corresponding to screen 1 or the summary information corresponding to screen 2, through a touch input (or a key input), thereby requesting to move and arrange the icon 442 to one of screen 1 or screen 2.

Figure 4C:
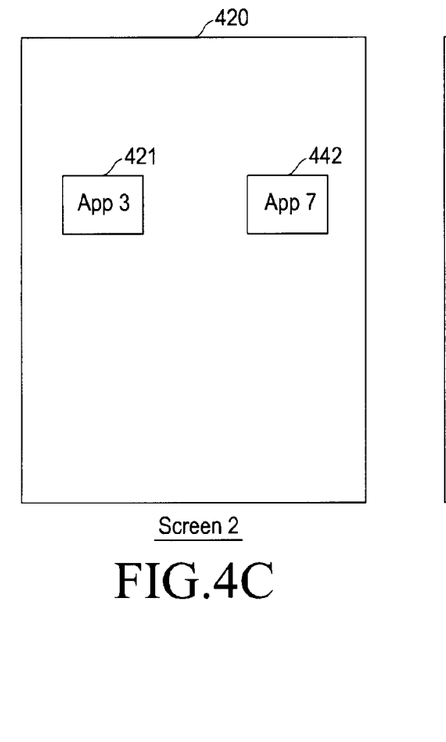
Figure 4D:
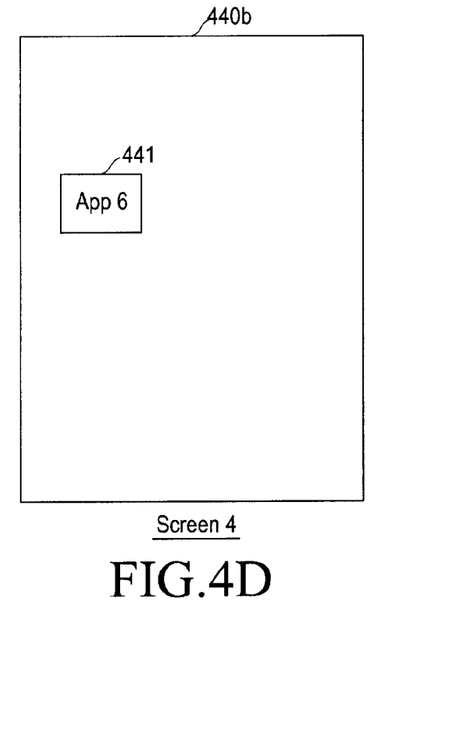

When the user has made a touch input as indicated by reference numeral 460*b* in FIG. 4B in order to request to move and arrange the icon 442 to the summary information corresponding to screen 2, the controller 10 makes a control to move and arrange the icon 442 to and on screen 2 as shown in FIG. 4C, in response to the touch input. When the icon 442 has been moved from screen 4 to screen 2, the controller 10 makes a control to display only the icon 441 on screen 4 as shown in FIG. 4D.

In steps S205 and S206, when the displayed summary information has been rearranged by the user, the controller 10 makes a control to change the sequence in which the screens are arranged in accordance with the rearranged summary information.

The embodiment described above with reference to steps S203 and S204 relates to moving an icon from one screen to another screen. However, the embodiment of the present invention additionally provides a method of changing the arrangement sequence of screens through steps S205 and S206.

In other words, when the user has made a user input, such as a menu selection, a long contact on an icon, or the like, and summary information corresponding to each screen has been accordingly displayed, then the user can easily change the arrangement sequence (for example, display sequence) of the screens by using the displayed summary information.

Figure 5A:
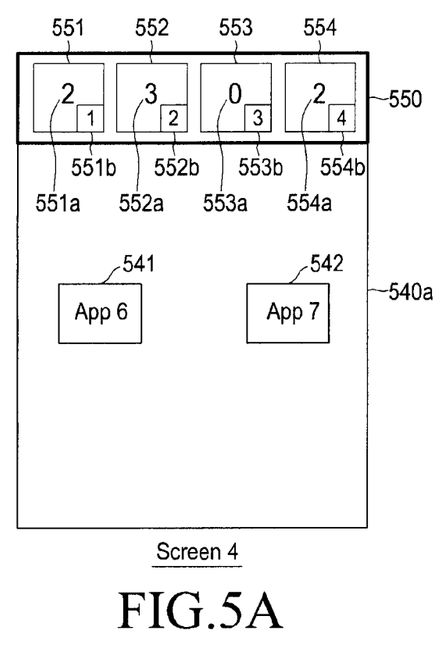
FIGS. 5A, 5B and 5C are views illustrating a third example of managing screens according to an embodiment of the present invention.

This process will be described below in more detail with reference to FIGS. 5A to 5C. As shown in FIG. 5A, when respective pieces of summary information (or summary icons) 551, 552, 553, and 554 corresponding to screens 1 to 4 shown in FIG. 3 are sequentially displayed in accordance with the sequence in which screens 1 to 4 are arranged, the user may change the display sequence by moving icons displaying the summary information through a touch input, or the like, and the controller 10 makes a control to change the arrangement sequence of the screens in accordance with the changed display sequence of the summary information.

Figure 5B:
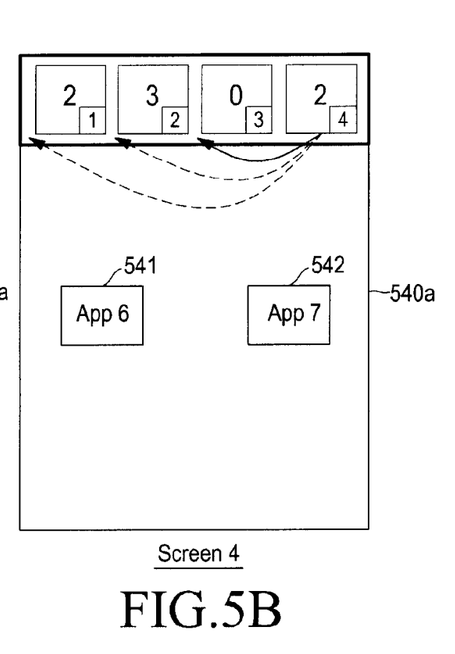

For example, when it is assumed that the user wants to change the arrangement sequence of screen 4 (the arrangement sequence is fourth) shown in FIG. 3D, the user may change the display sequence of the summary information 554 corresponding to screen 4 as indicated by reference numeral 560*a*, 560*b*, or 560*c* shown in FIG. 5B, so as to request a change in the arrangement of the screens.

For example, when the user moves the summary information 554 corresponding to screen 4 to a location between the summary information 552 corresponding to screen 2 and the summary information 553 corresponding to screen 3 by dragging the summary information 554 as indicated by reference numeral 560*c* shown in FIG. 5B, the controller 10 makes a control to change the arrangement sequence of the screens by changing screen 4 to screen 3 while changing screen 3 to screen 4.

Figure 5C:
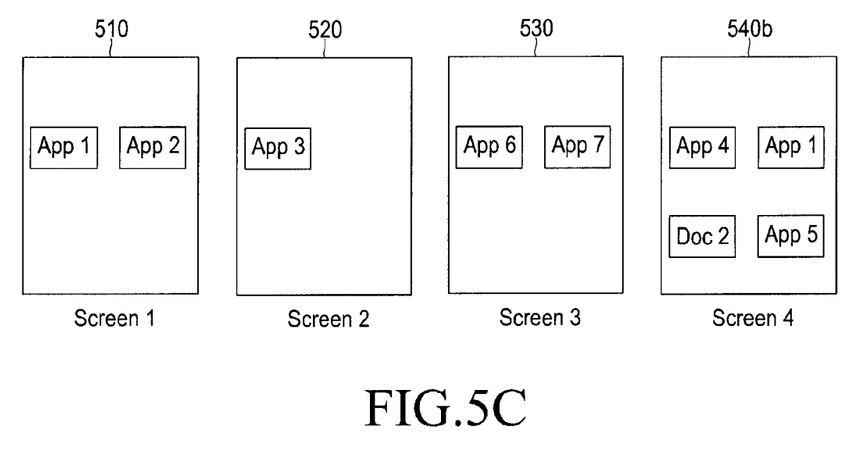

In other words, the sequence of screen 4 including the icon 541 of application 6 and the icon 542 of application 7 shown in FIG. 5B is originally the fourth and is changed into the third through the movement as indicated by reference numeral 560*c* shown in FIG. 5C.

Similarly, when the user moves the summary information 554 as indicated by reference numeral 560*a*, the sequence of screen 4 is changed from the fourth to the first and the sequences of the previous screens 1, 2, and 3 are changed to the second, the third, and the fourth, respectively.

Also, when the user moves the summary information 554 as indicated by reference numeral 560*b*, the sequence of screen 4 is changed from the fourth to the second, and the sequences of the previous screens 2 and 3 are changed to the third and the fourth, respectively.

By the embodiment described above with reference to steps S205 and S206, in using a portable terminal including several screens where icons are arranged, the user may easily and selectively change the sequence of arranged screens to configure the portable terminal to be more user-friendly.

Meanwhile, although the embodiment has been described using icons, the embodiment may be identically applied to widgets providing functions similar to those of icons in such a way that a widget may be quickly moved to and displayed on a particular screen.

It should be apparent to those skilled in the art that the embodiment described above provides an advantage of conveniently managing screens and icons arranged on the screens, which enables an easy change of the place in the sequence of a screen and an easy movement of an icon arranged on a screen.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method of managing a plurality of home screens of a portable terminal, the method comprising:
   displaying a home screen of the plurality of home screens;
   in response to detecting a request moving a particular icon of the displayed home screen, additionally displaying summary information including a plurality of summary icons on the home screen, each summary icon representing each of the plurality of home screens; and
   in response to detecting an input moving the particular icon to one of the summary icons, moving the particular icon to a home screen corresponding to the one of the summary icons,
   wherein additionally displaying summary information comprises:
      after a number of icons movable to a corresponding home screen is zero, displaying a particular summary icon highlighting the corresponding home screen.

2. The method of claim 1, wherein additionally displaying the summary information further comprises at least one of:
   displaying the summary information corresponding to each of the home screens in a separate home screen area; and
   displaying the summary information corresponding to each of the home screens through On-Screen Display (OSD).

3. The method of claim 1, wherein each summary icon further comprises one or more of:
   a displayed number indicating a number of icons movable to each corresponding home screen represented by each summary icon,
   a displayed number indicating a number of icons currently present within each corresponding home screen, and
   a displayed number indicating a display sequence order of each corresponding home screen relative to other corresponding home screens.

4. The method of claim 1, further comprising
   detecting movement of at least one of the plurality of summary icons indicating a desired order sequence, and
   rearranging the summary icons according to the detected movement.

5. The method of claim 4, further comprising:
   changing an order of the home screens according to the rearranged summary icons.

6. The method of claim 5, wherein the order of the home screens is changed to correspond to the desired order sequence.

7. The method of claim 1, wherein, when the number of icons movable to a particular home screen is zero, the one of the summary icons corresponding to the particular home screen is displayed with red color.

8. The method of claim 1, wherein each home page has a maximum number of icons that each home page can include, and wherein each summary icon further comprises:
   an indicator indicating a number of icons that can be added to a corresponding home screen before the home page includes the maximum number of icons.

9. The method of claim 1, further comprising:
   after moving the particular icon, displaying the corresponding home screen that includes the particular icon.

10. A screen management apparatus of a portable terminal, comprising:
a display configured to display a home screen of a plurality of home screens in which icons can be arranged; and
a controller configured to:
in response to detecting a request moving a particular icon of the displayed home screen, additionally display summary information including a plurality of summary icons on the home screen, each summary icon representing each of the plurality of home screens; and
in response to detecting an input moving the particular icon to one of the summary icons, move the particular icon to a home screen corresponding to the one of the summary icons
wherein additionally displaying summary information comprises:
after a number of icons movable to a corresponding home screen is zero, displaying a particular summary icon highlighting the corresponding home screen.

11. The screen management apparatus of claim 10, wherein the controller is further configured to perform one of:
displaying the summary information corresponding to each of the home screens in a separate home screen area; and
displaying the summary information corresponding to each of the home screens through On-Screen Display (OSD).

12. The screen management apparatus of claim 10, wherein each of the plurality of summary icons further comprises one or more of:
a displayed number indicating a number of icons movable to each of the plurality of home screens represented by each of the plurality of summary icons,
a displayed number indicating the number of icons currently present within each of the plurality of home screens, and
a displayed number indicating a display sequence order of each home screen relative to remaining home screens of the plurality of home screens.

13. The screen management apparatus of claim 12, wherein when the number of icons movable to a particular home screen of the plurality of home screens is zero, one of the plurality of summary icons corresponding to the particular home screen is displayed with red color.

14. The screen management apparatus of claim 10, wherein the controller further configured to:
detect movement of at least one of the plurality of summary icons indicating a desired order sequence, and
rearrange the summary icons according to the detected movement.

15. The screen management apparatus of claim 14, wherein the controller is further configured to change an order of the plurality of home screens according to the rearranged summary icons.

16. The screen management apparatus of claim 15, wherein the order of the plurality of home screens is changed to correspond to the desired order sequence.

17. The screen management apparatus of claim 10, wherein each home page has a maximum number of icons that each home page can include, and wherein each of the plurality of summary icons further comprises:
an indicator indicating a number of icons that can be added to a corresponding home screen before the home page includes the maximum number of icons.

18. The screen management apparatus of claim 10, wherein the controller is further configured to, after moving the particular icon display the corresponding home screen that includes the particular icon.

* * * * *